UNITED STATES PATENT OFFICE.

CLYDE M. WEST, OF PIOCHE, NEBRASKA.

RESILIENT WHEEL.

1,155,456.     Specification of Letters Patent.     Patented Oct. 5, 1915.

Application filed October 18, 1913. Serial No. 795,988.

*To all whom it may concern:*

Be it known that I, CLYDE M. WEST, a citizen of the United States, residing at Pioche, in the county of Lincoln and State of Nebraska, have invented certain new and useful Improvements in Resilient Wheels, of which the following is a specification.

This invention relates to resilient wheels of that type in which the pneumatic tire will be eliminated and a simple means substituted therefor, which will not only absorb the shock occasioned to the tread of the wheel, but will likewise be durable and inexpensive to manufacture.

An object of this invention resides in the provision of shock absorbing springs which are associated with a solid resilient tread portion, these elements being so connected together as to be capable of the shock absorbing qualities common to the pneumatic tire, and being of such a construction as to be readily connected together for performing the desired function.

Other objects as well as the nature, characteristic features and scope of my invention will be more readily understood from the following description taken in connection with the accompanying drawings and pointed out in the claims forming a part of this specification.

Figure 1:
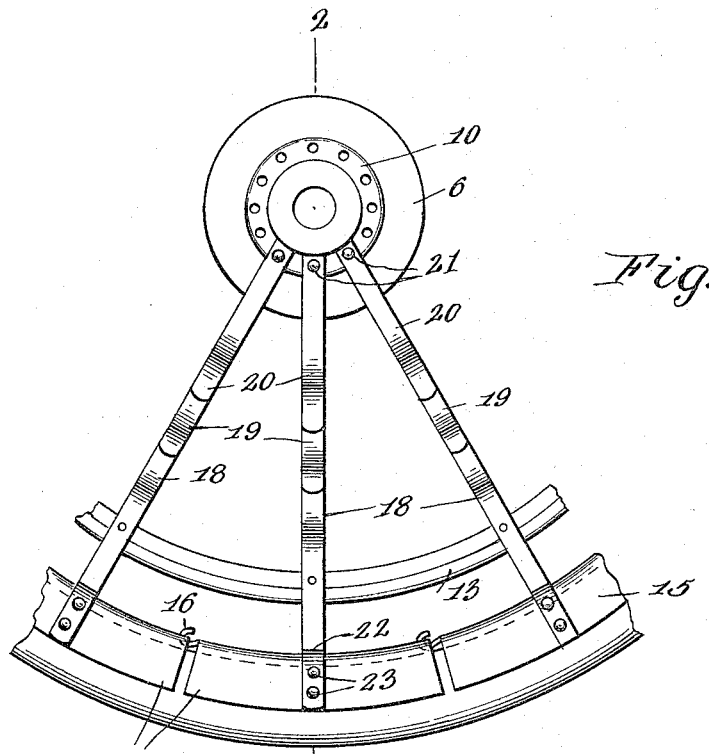

Referring to the drawings: Figure 1 is a fragmentary side elevational view of a wheel embodying my invention; and Fig. 2 is a sectional view taken on the line 2—2 of Fig. 1.

In the drawings wherein is illustrated the preferred embodiment of this invention, a hub 5 is provided which is of the ordinary substantially cylindrical configuration, slightly tapering toward the outer end thereof, being provided on the inner end with an enlarged flange or disk 6, and having formed midway the ends thereof a plurality of sockets 7. The hub is provided adjacent the outer end thereof with an annular recess or groove 8, and adjacent the inner end near the flange 6, with a similar recess 9, a flange 10 being extended from the hub 5 adjacent the annular recess 8.

Figure 2:
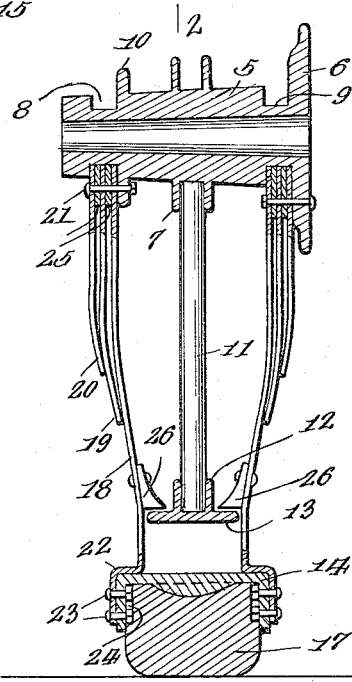

Radiating from the hub 5 are a multiplicity of spokes 11 one end of each of which is engaged in one of the sockets 7, while the opposite end is in engagement with a socket 12, said socket 12 being formed on the inner face of an annular rim 13 as advantageously illustrated in Fig. 2. A plurality of sockets 12 similar to that shown in Fig. 2 are arranged in uniformly spaced relation upon the inner periphery of the rim 13 and are engaged with the spokes 11 as previously pointed out.

Normally lying in spaced relation to the outer periphery of the rim 13 is an outer rim or flange 14 which is formed from a plurality of plates 15, each of said plates being provided with a hook 16 in the one end thereof and a recess or groove complemental to said hook 16 in the opposite end. Each of said plates has the longitudinal edges thereof bent into parallelism and is adapted for engagement with a solid resilient tread 17, the sides of said plates engaging the sides of said tread as shown to advantage in Fig. 2.

Interposed between the outer rim 14 and the hub 5 are a plurality of sets of springs each composed of an inner, an intermediate and an outer spring 18, 19 and 20, respectively. The innermost of said springs, as indicated at 18, has one end thereof secured to the annular flange 10 of the hub 5 through the medium of a bolt 21 or analogous detachable fastening means, then is curved inwardly toward the inner rim 13, and the outer end thereof is bent outwardly and a portion, as indicated at 22, engages the inner periphery and side face of each of said plates 15, and is detachably secured thereto through the medium of bolts 23 or the like, the inner ends of which engage in the recess 24 provided in the tread 17, for this purpose. The intermediate spring 19 has the inner end thereof engaged in the annular recess 8, one face thereof being in engagement with a spacing washer 25, while the opposite face is in engagement with a similar washer interposed between the intermediate spring and the outer spring 20, the bolt 21 extending through said washers and said springs, and also through the annular flange 10, the opposite or outer end of said intermediate spring lying in engagement with the outer face of the spring 18, approximately midway the ends of the latter. The outer spring 20 is engaged in the annular recess 8, having the inner face thereof engaged with one of the spacing washers 25 and the outer face thereof engaged with the side of the recess 8, the head of the bolt 21 lying in engagement therewith so as to snugly hold the springs in engagement with the washers 25 and the annular flange 10 as shown. The sets of springs are identical on both sides of the wheel, but are oppositely disposed, as clearly shown in Fig. 2.

In order to limit the inward movement of the tread 17, when undue pressure is exerted on the outer periphery thereof, the inner rim 13 as previously pointed out, has been provided, while stops 26 are arranged on the inner face of each of the springs 18, adjacent the portions 22 thereof, so as to prevent the outward movement of the tread 17, said stops being secured to the springs 18 by rivets or the like.

In operation, we will assume that the springs 18, 19 and 20 have been engaged within the annular recesses 8 and 9, the springs 18 being in engagement with the plates 15 secured thereto, as shown to advantage in Fig. 2, in which instance the springs 18, 19 and 20 are arranged in parallelism to the spokes 11, a set of each of said springs being arranged on each side of one of said spokes. As soon as pressure is exerted on the tread 17, the springs 18, which are the first to be tensioned will be slightly bowed, causing the lateral expansion of the springs 19 and 20 which are engaged with the springs 18 as previously pointed out, and should undue pressure be exerted on said tread, the inner face of each of said plates 15 will engage with the outer periphery of the inner rim 13, thereby limiting the movement of the treads, while the outer movement of the tread is limited as previously pointed out, through the medium of the stops 26.

It will be understood that the above description and accompanying drawings comprehend only the general and preferred embodiment of my invention and that various minor changes in details of construction, proportion and arrangement of the parts may be made within the scope of the appended claims without sacrificing any of the advantages of my invention.

Having thus fully described my invention, what I claim as new and desire to secure by Letters Patent is:—

1. A spring wheel including a hub, rim and tread, spokes connecting the hub and rim, springs arranged in pairs on said hub and secured thereto, certain of which extend beyond the rim and in proximity to the margin thereof into engagement with the tread, the latter being arranged in spaced relation to the rim, and stops mounted on the inner faces of said certain springs for abutment with the rim, whereby undue lateral thrust of the springs is prevented when pressure is exerted on said tread.

2. A spring wheel including a hub, a flange formed on the inner end of said hub, a flange formed in proximity to the outer end of said hub, a plurality of uniformly spaced sockets arranged on the outer periphery of said hub approximately midway the ends, thereof, said hub being provided with an annular recess in proximity to each of said flanges, a plurality of spokes radiating from said hub, one end of each of which is engaged in one of said sockets, a rim arranged on the outer ends of said spokes, a second rim comprising a plurality of hingedly connected plates arranged in spaced relation to said first mentioned rim, a tread carried by said plates, a plurality of springs one end of each of which is engaged in one of said recesses, and means for securing said springs to said hub, some of said springs having engagement with said plates, for the purpose specified.

3. A spring wheel including a hub, a multiplicity of spokes radiating from said hub, a rim connecting said spokes at the outer ends thereof, a rim arranged in spaced relation to said first mentioned rim, said second mentioned rim comprising a plurality of hingedly connected plates each of which has the longitudinal edges thereof turned into parallelism, a tread portion arranged between the parallel edges of said plates, a plurality of springs one end of each of which is in engagement with said hub, spacing washers arranged between each of said springs for holding the same in spaced apart relation, a series of said spokes being arranged in pairs on the sides of said spokes, said springs varying in size, one of the springs of each series being engaged with one of said plates, and stops arranged on each of said plate engaging springs for limiting the movement of said tread.

In testimony whereof I affix my signature in presence of two witnesses.

CLYDE M. WEST.

Witnesses:
M. L. LEE,
GEO. W. FRANKS.

Copies of this patent may be obtained for five cents each, by addressing the "Commissioner of Patents, Washington, D. C."

Correction in Letters Patent No. 1,155,456.

It is hereby certified that the residence of the patentee in Letters Patent No. 1,155,456, granted October 5, 1915, upon the application of Clyde M. West, for an improvement in "Resilient Wheels," was erroneously written and printed as "Pioche, Nebraska," whereas said residence should have been written and printed as *Pioche, Nevada;* and that the said Letters Patent should be read with this correction therein that the same may conform to the record of the case in the Patent Office.

Signed and sealed this 2nd day of November, A. D., 1915.

[SEAL.]

R. F. WHITEHEAD,
*Acting Commissioner of Patents.*